(12) United States Patent
Stuttaford et al.

(10) Patent No.: US 7,299,620 B2
(45) Date of Patent: Nov. 27, 2007

(54) TORNADO TORCH IGNITER

(76) Inventors: Peter Stuttaford, 12075 159th Ct. North, Jupiter, FL (US) 33478; John Henriquez, 8775 SE. Bahama Cir., Hobe Sound, FL (US) 33455; Paul Economo, 5540 N. Ocean Dr., Apt 11A, Singer Island, FL (US) 33404

( * ) Notice: Subject to any disclaimer, the term of this patent is extended or adjusted under 35 U.S.C. 154(b) by 524 days.

(21) Appl. No.: 10/880,073

(22) Filed: Jun. 29, 2004

(65) Prior Publication Data

US 2005/0284442 A1 Dec. 29, 2005

(51) Int. Cl.
*F02C 7/26* (2006.01)
*F02C 7/264* (2006.01)

(52) U.S. Cl. ................. 60/39.826; 60/39.821

(58) Field of Classification Search ............ 60/39.821, 60/39.826, 737, 748
See application file for complete search history.

(56) References Cited

U.S. PATENT DOCUMENTS

| | | | |
|---|---|---|---|
| 3,073,121 A * | 1/1963 | Baker et al. ............. | 60/39.826 |
| 4,275,559 A | 6/1981 | Blair | |
| 4,860,533 A | 8/1989 | Joshi | |
| 4,938,019 A | 7/1990 | Angell et al. | |
| 5,085,040 A | 2/1992 | Tilston | |
| 5,163,287 A | 11/1992 | Shekleton et al. | |
| 5,660,043 A | 8/1997 | Pfefferle et al. | |
| 5,720,163 A | 2/1998 | Pfefferle et al. | |
| 6,016,658 A * | 1/2000 | Willis et al. ................. | 60/737 |
| 6,182,436 B1 | 2/2001 | Prociw et al. | |
| 6,557,350 B2 | 5/2003 | Farmer et al. | |
| 6,748,735 B2 * | 6/2004 | Schmotolocha et al. . | 60/39.826 |

* cited by examiner

*Primary Examiner*—Ted Kim

(57) ABSTRACT

An ignition system having improved reliability for a gas turbine combustor is disclosed. The ignition system comprises an outer housing having at least one fuel passage and an electrode extending therethrough forming a generally annular passage for cooling air to pass to a mixing chamber. Fuel and air mix in the mixing chamber to form a combustible mixture that is ignited by the electrode. The outer housing further comprises a plurality of air swirl holes to effectively cool the walls of the mixing chamber as well as to provide improved flame stability.

16 Claims, 4 Drawing Sheets

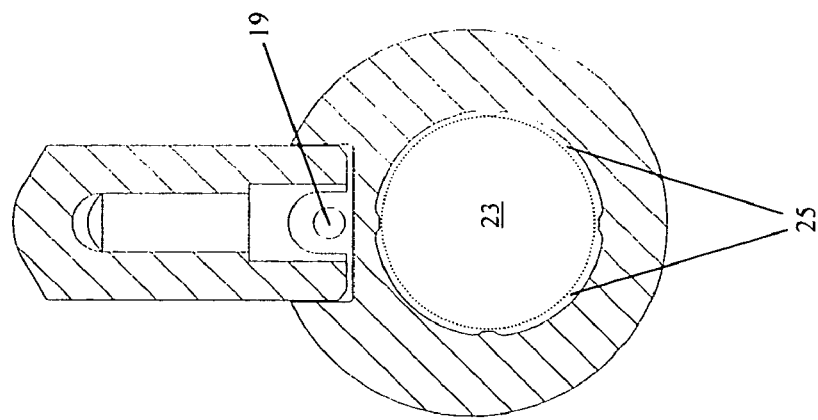
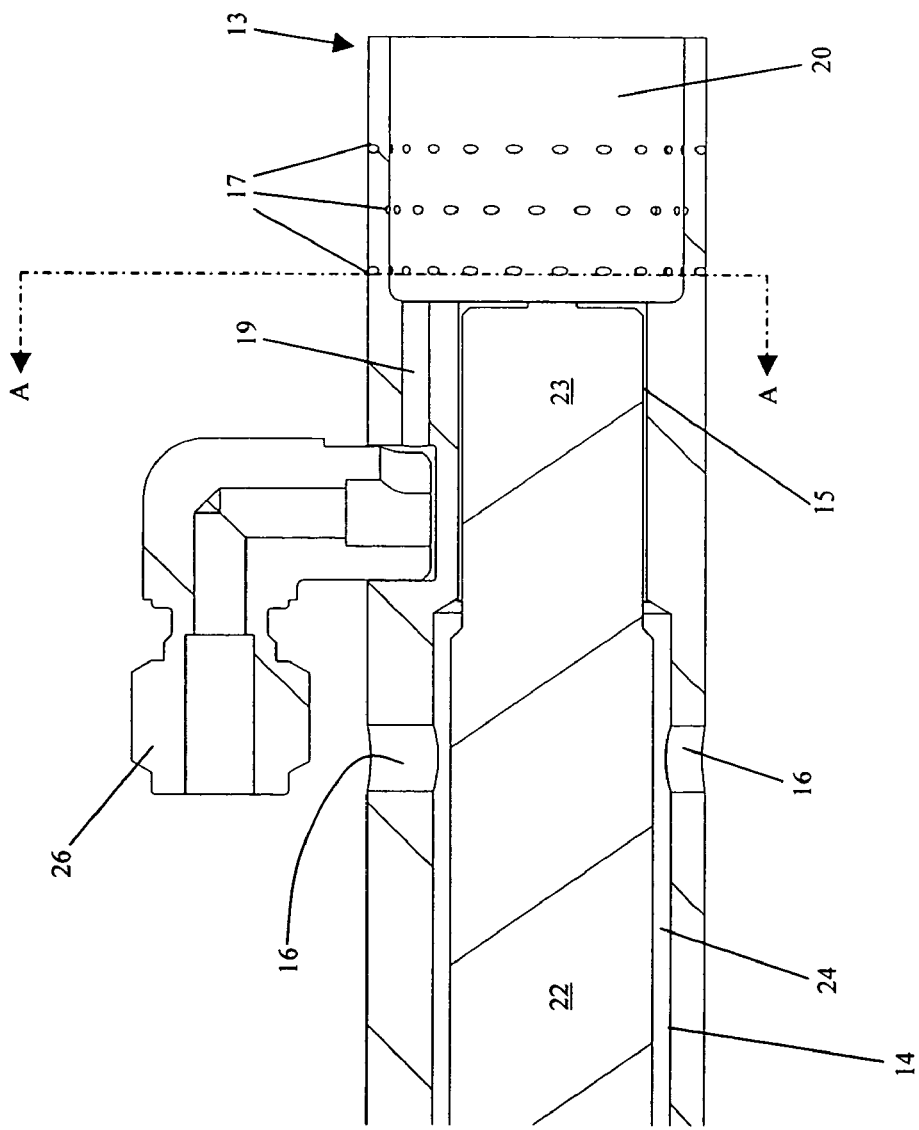
Figure 4
Figure 3

TORNADO TORCH IGNITER

TECHNICAL FIELD

The present invention generally relates to gas turbine engines and more specifically to an ignition system that provides an improved starting reliability for a combustion system of the gas turbine engine.

BACKGROUND OF THE INVENTION

Combustion within gas turbine engines is typically initiated by an ignition system having a heating source. Historically, two different types of igniters have been used, one located within the combustion chamber and the other located outside of the combustion chamber. It is preferred from a durability point of view to have the ignition system located outside of the combustion chamber such that it is not directly in contact with the hot combustion gases that can reduce component life. However, this arrangement requires the ignition system to be extremely reliable given its proximity to the combustible mixture. Because of this reliability issue, a compromise of configurations evolved resulting in a retractable igniter. Once ignition occurs, the igniter is retracted to a position that is a sufficient distance from the hot combustion gases. This system, while effective, requires additional hardware in order to ensure that the igniter is properly positioned at all times.

In an attempt to provide an igniter positioned a sufficient distance from the combustion chamber, torch igniters have often been utilized. A torch igniter is most commonly described as a system that co-locates an ignition source with a fuel injector, which is auxiliary to a combustion system main injector. This igniter geometry is most common in combustion systems operating on liquid fuel, similar to that disclosed in U.S. Pat. No. 5,085,040. One disadvantage to a torch igniter with liquid fuel is the blockage of the fuel injector that can be due to debris or coking of the fuel due to its operating temperature. Should the fuel flow to the torch igniter remain steady in order to limit the amount of coking, even once the combustion chamber is lit, ineffective mixing of the igniter fuel source within the combustion chamber fuel source can produce unnecessary distress to the combustion chamber in the form of hot streaks effecting combustion chamber cooling.

Today, a majority of land-based gas turbine engines operate on a gas fuel, such as natural gas, in order to limit harmful emissions to the atmosphere. Therefore, it is necessary to provide an ignition system that primarily operates on gas while having the capability of operating on a liquid fuel, as well while avoiding the issues identified in the prior art relating to start-up reliability, prolonged exposure to combustion temperatures, fuel blockage/coking in the ignition system, and hot streaks in the combustion chamber associated with continuous operation.

SUMMARY AND OBJECTS OF THE INVENTION

The present invention is an ignition system for a gas turbine combustor that provides a reliable source of ignition. The preferred embodiment of the ignition system comprises an outer housing comprising a first end and second end in spaced relation, a first inner wall, a second inner wall proximate the second end, at least one air supply hole, a plurality of air swirl holes, at least one fuel passage, and a mixing chamber proximate the second end. An additional feature of the ignition system is an electrode that extends through a portion of the outer housing thereby forming a generally annular passage between the electrode and the outer housing. The generally annular passage is in fluid communication with at least one air supply hole. A plurality of channels is located between the tip of the electrode and the second inner wall of the outer housing, with the plurality of channels in fluid communication with the generally annular passage.

In operation, compressed air enters through at least one air inlet hole and into the generally annular passage before passing into the plurality of channels and into the mixing chamber. Compressed air also passes through a plurality of air swirl holes in the outer housing to create a tornado effect along the wall of the mixing chamber for effectively cooling the mixing chamber walls as well as for providing excellent flame stability. A flame is created when fuel from the at least one fuel passage is introduced to the mixing chamber with air from the plurality of channels and is ignited by the heat generated from the electrode. The ignition system is preferably positioned relative to a combustor such that its prolonged exposure to hot combustion gases is minimized.

It is an object of the present invention to provide a reliable ignition system for a gas turbine combustor.

It is another object of the present invention to provide an ignition system having improved cooling and flame stability.

In accordance with these and other objects, which will become apparent hereinafter, the instant invention will now be described with particular reference to the accompanying drawings.

BRIEF DESCRIPTION OF DRAWINGS

FIG. 3 is a detailed cross section of a portion of an ignition system in accordance with the preferred embodiment of the present invention.

FIG. 4 is a cross section of FIG. 3 taken along the line A-A.

DETAILED DESCRIPTION OF THE PREFERRED EMBODIMENT

Figure 1:
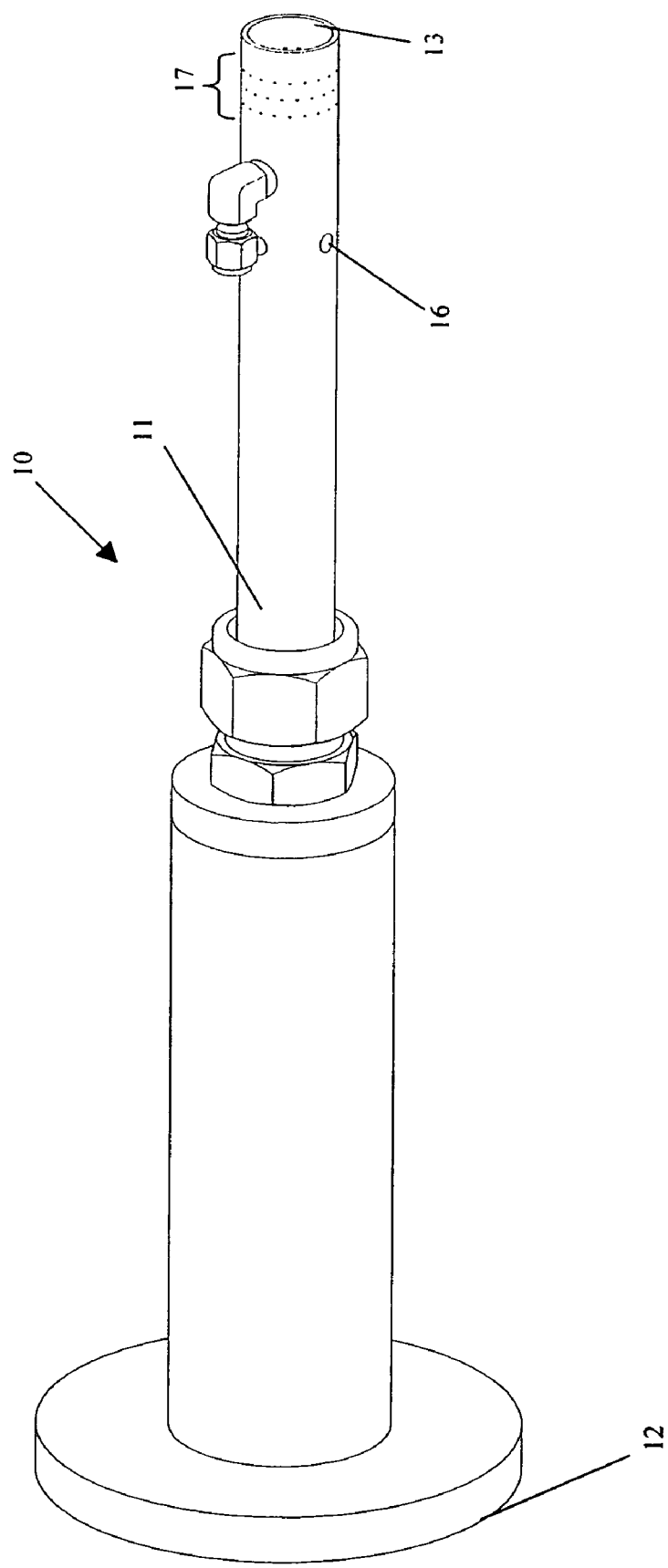
FIG. 1 is a perspective view of an ignition system in accordance with the preferred embodiment of the present invention.
Figure 2:
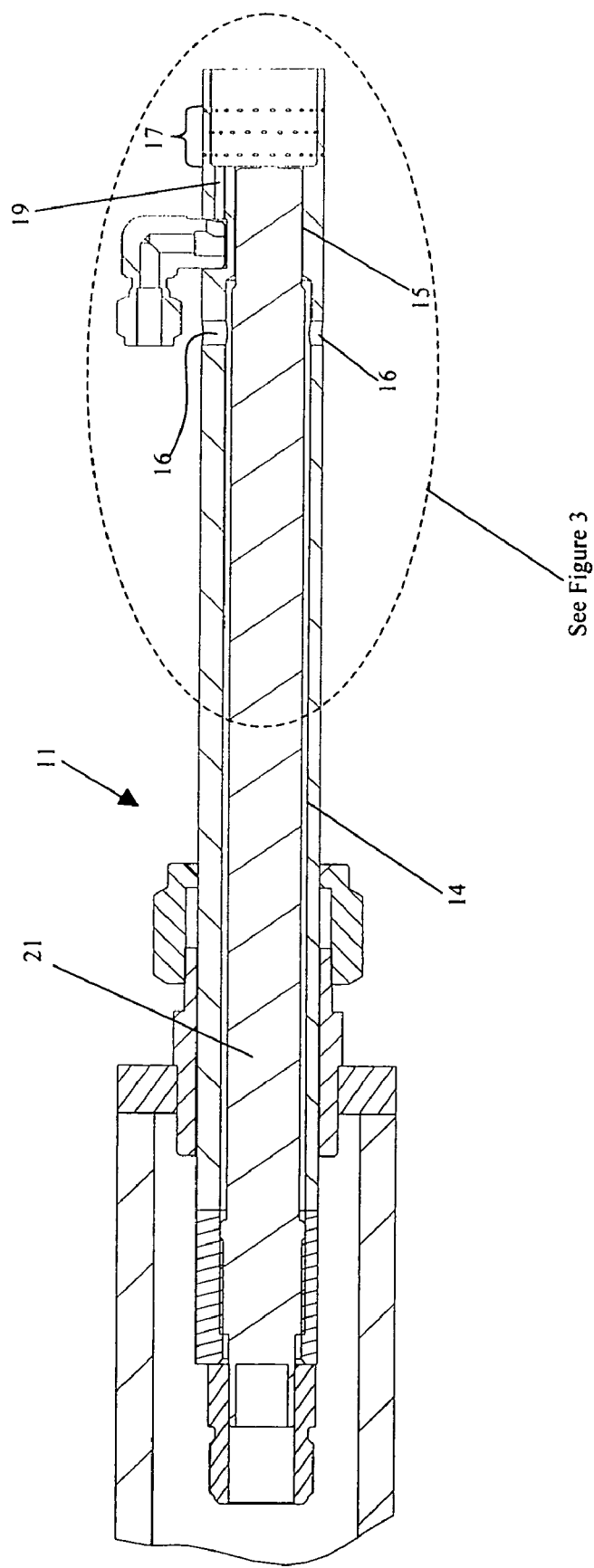
FIG. 2 is a cross section of a portion of an ignition system in accordance with the preferred embodiment of the present invention.
Figure 5:
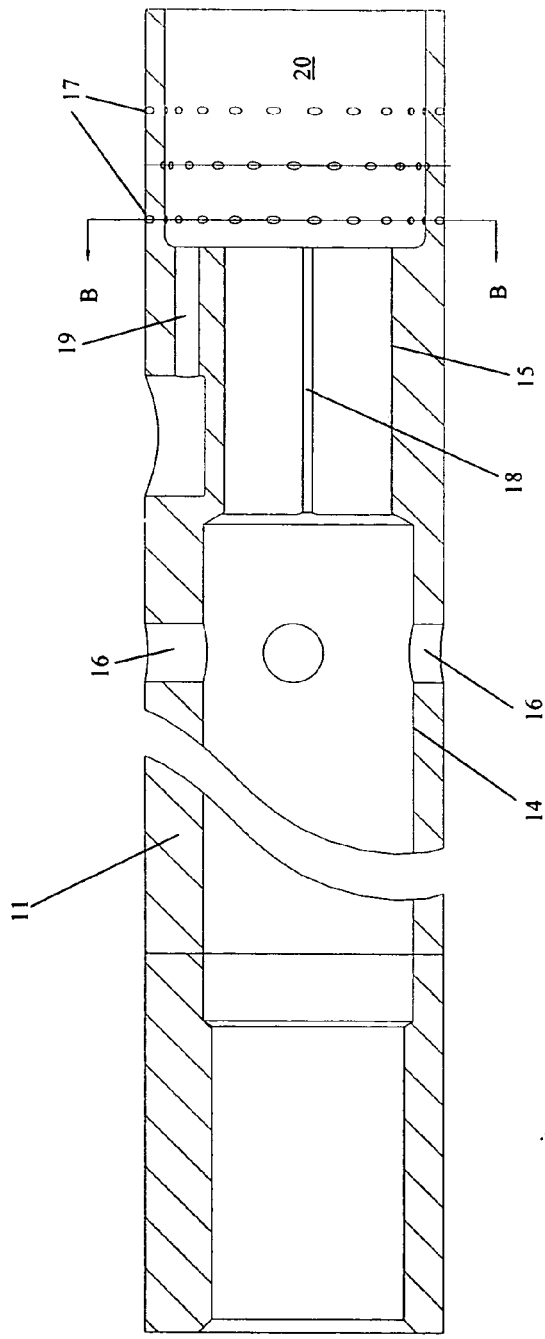
FIG. 5 is a partial cross section of a portion of the outer housing of an ignition system in accordance with the preferred embodiment of the present invention.
Figure 6:
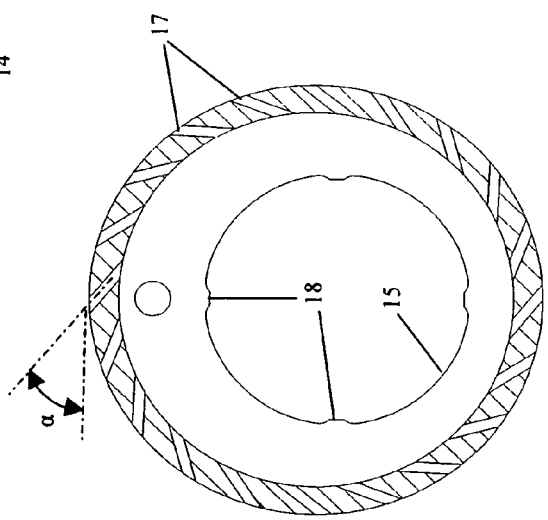
FIG. 6 is a cross section of FIG. 5 taken along the line B-B.

Referring to FIGS. 1-3, an ignition system 10 for a gas turbine combustor is shown in detail and preferably comprises an outer housing 11, which further comprises a first end 12, second end 13, a first inner wall 14, and a second inner wall 15 located proximate second end 13. Other features of outer housing 11 include at least one air supply hole 16 that extends through first inner wall 14 and a plurality of air swirl holes 17 that are located proximate second end 13. Air swirl holes 17 are preferably located in at least one row in outer housing 11 as shown in FIGS. 3, 5, and 6. Referring now to FIGS. 4 and 6, and located proximate second end 13, and along second inner wall 15 is at least one raised surface 18. Also located in outer housing 11, as can best be seen in FIG. 3, is at least one fuel passage 19 that extends towards second end 13 for injecting a fuel such as natural gas. Located adjacent second end 13 of outer housing 11 is a mixing chamber 20. In order to provide the desired level of cooling to the walls surrounding mixing chamber 20 and the stability to a flame source, air swirl holes 17 are oriented at a surface angle α relative to outer housing 11. In the preferred embodiment of the present invention surface angle α ranges between 20 degrees and 75 degrees.

Extending through a portion outer housing 11, towards second end 13, and preferably along a centerline of outer housing 11, is an electrode 21 having an electrode body 22 and electrode tip 23. As a result of electrode 21 being positioned within outer housing 11, a generally annular passage 24 is formed therebetween and is in fluid communication with at least one air supply hole 16. In the region between electrode tip 23, second inner wall 15, and at least one raised surface 18, a plurality of channels 25 are defined. Channels 25 can best be seen in FIG. 4, with the number of channels 25 being determined based on the number of raised surfaces 18. In the preferred embodiment, at least one raised surface 18 comprises four raised surfaces, thereby resulting in four channels 25. Channels 25, which are formed adjacent to second inner wall 15, are in fluid communication with generally annular passage 24.

In operation compressed air from an air source, such as the gas turbine engine compressor flows through at least one air supply hole 16 and into generally annular passage 24. The air then flows around electrode tip 23 by passing through plurality of channels 25 and into mixing chamber 20. Additionally, air swirls along the walls of mixing chamber 20 to effectively cool the walls as well as to provide a source of flame stability. Fuel, which will mix with the air from channels 25 to create the flame stabilized by the swirling flow of air, enters ignition assembly 10 through a fuel feed 26 and passes to at least one fuel passage 19, which extends towards second end 13 of outer housing 11. In order to provide the desired level of fuel and air mixing in mixing chamber 20 as well as for flame stability, it is preferred that at least one fuel passage 19 is radially outward of plurality of channels 25 and terminates upstream of plurality of air swirl holes 17. The fuel and air mix in mixing chamber 20 and this combustible mixture is then ignited by a heat source such as from a spark from electrode 21. As one skilled in the art of combustor ignition systems will understand, at least one fuel passage 19 is not limited to the embodiment disclosed. In order to accommodate various combustor configurations and assembly requirements, at least one fuel passage 19 may extend towards second end 13 from an area closer to first end 12 of outer housing 11.

While the invention has been described in what is known as presently the preferred embodiment, it is to be understood that the invention is not to be limited to the disclosed embodiment but, on the contrary, is intended to cover various modifications and equivalent arrangements within the scope of the following claims.

We claim:

1. An ignition system for a gas turbine combustor, said ignition system comprising:
   an outer housing comprising:
      a first end;
      a second end;
      a first inner wall;
      a second inner wall proximate said second end;
      at least one air supply hole extending through said first inner wall;
      a plurality of air swirl holes proximate said second end;
      at least one raised surface along said second inner wall proximate said second end;
      at least one fuel passage extending towards said second end for injecting a fuel;
      a mixing chamber proximate said second end;
   an electrode having an electrode body and electrode tip, said electrode extending through a portion of said outer housing towards said second end;
   a generally annular passage located between said electrode body and said outer housing and in fluid communication with said at least one air supply hole; and,
   a plurality of channels defined by said electrode tip, said second inner wall of said outer housing, and said at least one raised surface, said plurality of channels being in fluid communication with said generally annular passage;
   wherein said fuel mixes with air from said channels and said air swirl holes in said mixing chamber to form a combustible mixture that is ignited by said electrode.

2. The ignition system of claim 1 wherein said at least one raised surface comprises four raised surfaces.

3. The ignition system of claim 1 wherein said plurality of air swirl holes is located in at least one row in said outer housing.

4. The ignition system of claim 1 wherein said plurality of air swirl holes is oriented at a surface angle α relative to said outer housing.

5. The ignition system of claim 4 wherein said surface angle α is between 20 degrees and 75 degrees.

6. The ignition system of claim 1 wherein said electrode is located along a centerline of said outer housing.

7. The ignition system of claim 1 wherein said plurality of channels comprises four channels.

8. The ignition system of claim 1 wherein said at least one fuel passage is radially outward of said plurality of channels.

9. The ignition system of claim 1 wherein said at least one fuel passage terminates upstream of said plurality of air swirl holes.

10. An ignition system for a gas turbine combustor, said ignition system comprising:
    an outer housing comprising:
       a centerline;
       a first end;
       a second end;
       a first inner wall;
       a second inner wall proximate said second end;
       at least one air supply hole extending through said first inner wall;
       at least one row of air swirl holes proximate said second end;
       at least one raised surface along said second inner wall proximate said second end;
       at least one fuel passage extending towards said second end for injecting a fuel;
       a mixing chamber proximate said second end;
    an electrode having an electrode body and electrode tip, said electrode extending through a portion of said outer housing, along said centerline and towards said second end;
    a generally annular passage located between said electrode body and said outer housing and in fluid communication with said at least one air supply hole; and,
    a plurality of channels defined by said electrode tip, said second inner wall of said outer housing, and said at least one raised surface, said plurality of channels being in fluid communication with said generally annular passage;

wherein said fuel mixes with air from said channels and said air swirl holes in said mixing chamber to form a combustible mixture that is ignited by said electrode.

11. The ignition system of claim 10 wherein said at least one raised surface comprises four raised surfaces.

12. The ignition system of claim 10 wherein said at least one row of air swirl holes is oriented at a surface angle α relative to said outer housing.

13. The ignition system of claim 12 wherein said surface angle α is between 20 degrees and 75 degrees.

14. The ignition system of claim 10 wherein said plurality of channels comprises four channels.

15. The ignition system of claim 10 wherein said at least one fuel passage is radially outward of said plurality of channels.

16. The ignition system of claim 10 wherein said at least one fuel passage terminates upstream of said at least one row of air swirl holes.

* * * * *